Patented June 20, 1950

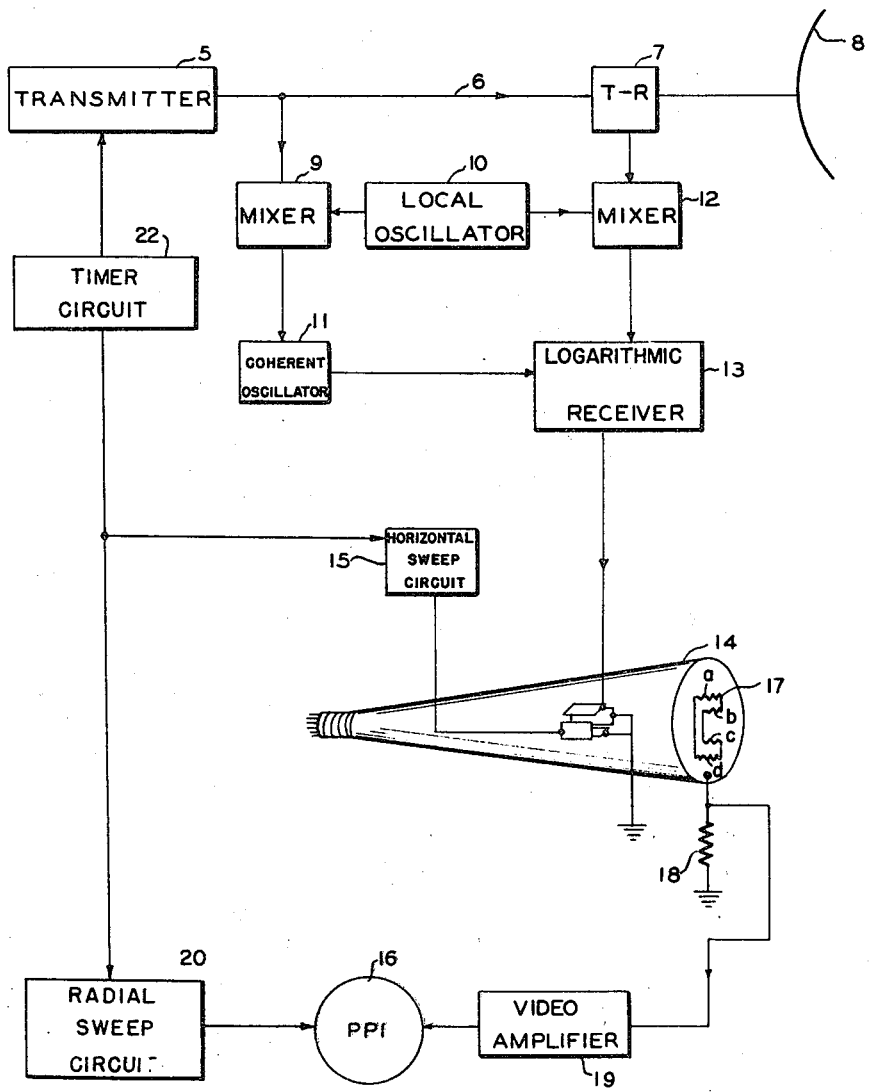

2,512,144

UNITED STATES PATENT OFFICE 2,512,144

MOVING OBJECT DETECTION SYSTEM

Alfred G. Emslie, Boston, Mass., assignor, by mesne assignments, to the United States of America as represented by the Secretary of War Application May 17, 1945, Serial No. 594,266

5 Claims. (Cl. 343—8)

The present invention relates to a radio object-location system of a character that is adapted to distinguish fixed objects from moving objects, and it relates more particularly to a component of such a system that is responsive to moving object echoes and is unresponsive to fixed object echoes.

In conventional radio object-location systems, so-called permanent echoes such as those from hills, trees and buildings frequently prevent the perception of moving objects. Several systems have been devised that distinguish fixed objects from moving objects by the character of the video pulses obtained from object returned echo pulses. All systems of this character are based upon some method of obtaining reference oscillations synchronized in fixed phase with respect to transmitted short duration, high carrier frequency exploratory pulses of radiant energy, receiving echo-pulses returned from objects, and combining said echo-pulses and said reference oscillations to obtain video pulses from the resultant combination.

The amplitude of the video pulses obtained is a function of the relative phase between the reference oscillations and the phase of the returning echo-pulses. Fixed objects reflect successive echo pulses always having the same phase relation with respect to the reference oscillations and hence are evidenced by video pulses having a constant amplitude. Moving objects, on the other hand, reflect successive echo-pulses having a progressive phase shift with respect to the reference oscillations and hence are evidenced by video pulses having a cyclical variation in amplitude.

By presenting the video pulses from moving and fixed objects on a cathode ray oscilloscope wherein a Cartesian representation of signal strength versus object range is shown, the character of the echoes serves to generally distinguish moving objects from fixed objects. If, however, video pulses are applied directly to a conventional PPI tube (Plan Position Indicator) wherein a map-like polar coordinate presentation is obtained there is no way of readily distinguishing fixed and moving objects. Furthermore, as it is desirable to eliminate fixed object echoes from the viewing screens of both Cartesian and PPI presentations, some device responsive only to moving object echoes is necessary. Such a device may be referred to as a moving object selector.

It is therefore an object of the present invention to provide a system whereby only video pulses representing moving objects appear on the cathode ray indicator.

It is a further object of the present invention to achieve the above object by the utilization of a storage device such as an Iconoscope.

The invention will be further understood from the following description when considered in connection with the accompanying drawing in which the single figure is a schematic diagram in block form of one embodiment of the present invention.

Although particular emphasis is directed to the use of an Iconoscope type storage tube as a moving object selector, other types of storage devices are contemplated within the scope of the invention.

One such moving object selector may consist of a cathode ray tube having a beam deflection means and containing a storage mosaic. There may be many embodiments of such a device but the operation of any one is contingent upon certain fundamental characteristics of the mosaic. In brief, the mosaic consists of a dielectric plate on one side of which is a metallic coating called the signal plate, the other side of the dielectric being coated with separately insulated microscopic emissive particles that when bombarded by an electron beam emit secondary electrons. It is, therefore, evident that in effect the mosaic constitutes a myriad of small condensers, one side of each consisting of an emissive particle and the second side of which is the signal plate. A connection from the signal plate through the glass envelope to an external output terminal is provided. By connecting a load to this output terminal an output signal may be developed under certain conditions.

In brief, the action of the mosaic is as follows, and for simplicity it will be assumed that the electron beam is stationary and strikes the mosaic only at a particular point. As the electron beam strikes the mosaic, the emissive particles under the incident beam will emit secondary electrons. The result is that the number of secondary electrons emitted exceed the number of incident electrons and the emissive elements become positively charged. As a result, a corresponding negative charge is built up on the signal plate in the usual manner of a condenser.

As the emissive element becomes increasingly positive, fewer secondary electrons are released, as the positive potential draws them back to said emissive element. As a result, the number of incident beam electrons striking the emissive element equals the number of secondary electrons emitted from the element, and a state of equilibrium is reached. When such an equilibrium exists, no additional charge is acquired by the emissive elements and hence no charging current flows to supply a negative charge to the signal plate. In a somewhat similar manner, equilibrium will be reached if the electron beam is not stationary but repeatedly traces the same path on the mosaic. A more complete description of an Iconoscope and of the action of a mosaic is more fully described in chapter 10 of "Television" by Zworykin and Morton, published in 1939 by John Wiley and Sons.

Referring now to the drawing, a transmitter 5 provides short duration, high carrier frequency exploratory pulses of radiant energy which are fed by suitable transmission means 6 through transmit-receive switch 7 to directional antenna 8.

Transmit-receive switch 7, which may also be referred to at a T—R box, functions during the transmission of exploratory pulses to connect transmitter 5 to antenna 8 and to disconnect the rest of the circuit shown. During the period between pulses the switch functions to disconnect the transmitter from the antenna, and to connect the antenna to the receiver channel presently to be described.

A portion of each of the transmitted exploratory pulses are applied to mixer 9, a second input to said mixer consisting of oscillations from local oscillator 10. The beat frequency output of mixer 9 is then applied as a synchronizing pulse to coherent oscillator 11 which is an oscillator generating intermediate frequency reference oscillations. This synchronizing pulse causes coherent oscillator 11 to generate oscillations whose phasal relations at any given time, referred to the time of the synchronizing pulse, are fixed (coherent) with respect to those of the transmitted exploratory pulses.

Echo pulses received at antenna 8 are fed through transmit-receive switch 7 to mixer 12, another input to mixer 12 comprising oscillations from local oscillator 10. The beat frequency output of mixer 12 consists of echo-pulses having a carrier frequency substantially equal to the frequency of the reference oscillations issuing from coherent oscillator 11. The output from mixer 12 and the reference oscillations from coherent oscillator 11 are then applied to a radio receiver 13.

The echo-pulses and reference oscillations are algebraically combined in the input of receiver 13 and the resulting combination is detected therein to provide video pulses. The output therefrom consists of two distinct types of video pulses. One consists of video pulses resulting from the echoes from fixed objects and having substantially constant amplitude, whereas the second consists of video pulses resulting from the echoes from moving objects and having a periodic variation in amplitude wherein the rate of variation is a function of object velocity.

Fixed objects reflect successive echo pulses having the same phase relation relative to the reference oscillation derived from coherent oscillator 11, hence are evidenced by video pulses having a constant amplitude. In contradistinction, moving objects reflect successive pulses having a progressive phase shift relative to the reference oscillations, hence they are evidenced in the output of receiver 13 by video pulses having a cyclical variation in amplitude. In order to accentuate the amplitude variations, receiver 13 preferably includes after the detector stage an output video amplifier having a logarithmic amplification characteristic. Such amplifiers are well known in the art, an amplifier of this type being described in the publication "Radio," January 1944 in the article "A Wide Range Logarithmic Amplifier" by Paul Selgin.

The video output from receiver 13 is applied to one pair of deflecting plates of moving object selector 14. Applied to the second pair of deflecting plates is a sweep voltage from horizontal line sweep circuit 15. Said sweep circuit is synchronized to the radial line sweep circuit 20 producing the beam deflection for the cathode ray indicator, which in the present embodiment is PPI tube 16. By means of synchronizing pulses generated by timer circuit 22, both the horizontal sweep circuit 15 and the radial line sweep circuit 20 are synchronized with transmitter 5, so that their respective traces commence at the instant pulse transmission.

Referring to selector 14, a Cartesian representation of signal strength versus range is traced on the mosaic; for example, range may be represented by a horizontal deflection and signal strength by a vertical deflection. For purposes of simplicity, one deflecting plate of each pair is shown connected to ground although it is apparent to one skilled in the art that other connections may be employed.

If, as in the present embodiment, range is represented by a horizontal deflection a "folded" time base (or sweep) may be used in order to make fuller use of the mosaic area. In such a case the total length of the time base representing range is equal to the sum of the horizontal lines traced on the mosaic. A pictorial representation 17 of such a trace is shown in the figure. A plurality of horizontal lines a, b, c, and d are traced in the course of a full sweep, successive horizontal lines being laterally displaced to prevent overlapping of the vertical deflections appearing on the lines, said deflections representing the applied video pulses. In the case of video pulses representing stationary objects, the electron beam will repeatedly trace the same vertical deflection path on the mosaic, and a state of equilibrium is reached. When such an equilibrium exists no additional charge is acquired by the mosaic and no charging current flows through load resistance 18 which is connected to the signal plate.

For video pulses derived from moving objects, however, the electron beam will not repeatedly trace the same vertical deflection path, and, as a result, new areas of the mosaic are constantly charged thereby causing current to flow through load resistance 18. Each time the electron beam charges a new portion of the mosaic a signal is developed across load resistance 18 proportional to the amount of charge. This signal appears in the form of pulses which may be then applied to video amplifier 19.

As there is a state of equilibrium reached for echoes from fixed objects and no equilibrium for echoes from moving objects, the signals applied to video amplifier 19 represent only those from moving objects. The output from video amplifier 19 may then be applied to the intensifying grid of PPI tube 16 in the normal manner. A map-like presentation showing only echoes from moving objects is thereby obtained.

The term "carrier frequency" of a pulse as used in the specification and claims refers to the center frequency of the band of frequencies contained in the pulse.

Although in the present embodiment the electron beam is deflection modulated to provide a charge on the mosaic that is in equilibrium for video pulses evidencing fixed objects, and not in equilibrium for video pulses evidencing moving objects, it will be manifest to those skilled in the art that the electron beam may be intensity modulated and that various other changes and modifications may be made therein without departing from the invention; and it is therefore aimed in the appended claims to cover all such changes and modifications as fall within the spirit and scope of the invention.

I claim:

1. A radio object-location system including means for transmitting short duration, high carrier-frequency exploratory pulses of radiant energy, means for obtaining reference oscillations in phase coherence with said exploratory pulses, means for receiving echo pulses from fixed and moving objects and means for combining said reference oscillations and said echo-pulses to obtain corresponding video pulses, a storage device, said storage device including a mosaic element having a signal plate, means for generating an electron beam, beam deflection means and means for directing said beam to said mosaic element; a sweep circuit external to said storage device and operatively connected with said beam deflection means to provide beam deflection in one direction, means for applying said video pulses to said deflection means to deflect said beam in a second direction, said video pulses resulting from said echoes from fixed objects causing said electron beam to repeatedly trace substantially the same path on said mosaic element, and said video pulses resulting from said echoes from moving objects causing said electron beam to continually trace new paths on said mosaic, a load impedance connected to said signal plate, said storage device providing, for moving object echoes, output voltage pulses of varying amplitude across said load impedance, said output voltage pulses being substantially proportional to said moving object video pulses, and said storage device providing a non-pulse voltage across said load impedance for fixed object video pulses, a video amplifier and means for applying said output voltage pulses thereto, a pulse operated indicating means and means for applying said amplified video pulses thereto to provide an indication of moving objects only.

2. In a radio object-location system of the character described which distinguishes between fixed objects and moving objects by the character of the video pulses obtained from received echo pulses and wherein fixed objects are evidenced by video pulses having substantially constant amplitude and moving objects are evidenced by video pulses having a periodic variation in amplitude; a storage device, said storage device including a mosaic element having a signal plate, means for generating an electron beam, beam deflection means and means for directing said beam to said mosaic; a sweep circuit external to said storage device and operatively connected with said beam deflection means to provide beam deflection in one direction, means for applying said video pulses to said deflection means to deflect said beam in a second direction, said video pulses resulting from said echoes from fixed objects causing said electron beam to repeatedly trace substantially the same path on said mosaic element and said video pulses resulting from said echoes from moving objects causing said electron beam to continually trace new paths on said mosaic, a load impedance connected to said signal plate, said storage device providing, for moving-object echoes, output voltage pulses of varying amplitude across said load impedance, said output voltage pulses being substantially proportional to said moving object video pulses and said storage device providing a non-pulse voltage across said load impedance for fixed-object video pulses, a pulse operated indicating means and means for applying said video pulses thereto to provide an indication of moving objects only.

3. In a radio echo object-location system of the character described, which distinguishes between fixed objects and moving objects by the character of the video pulses obtained from received echo pulses and wherein fixed objects are evidenced by video pulses having substantially constant amplitude and moving objects are evidenced by video pulses having a periodic variation in amplitude, a storage device, said storage device including an electron emissive mosaic element having a nonemissive signal plate, a load impedance connected to said signal plate, means for generating an electron beam and means for directing said electron beam to said mosaic element; means for deflecting said beam along a time base axis, means to deflect said electron beam along a second axis, and means to impress said video pulses as a modulating voltage on said second axis deflection means whereby video pulses having a periodic variation in amplitude develop an output voltage pulse across said load impedance proportional to said video periodic variation in amplitude and video pulses having a substantially constant amplitude develop a substantially constant voltage across said load impedance, a pulse-operated indicator, and means for applying said output pulses thereto to provide an indication of moving objects only.

4. In a coherent oscillator pulse-echo object locating system of the character described wherein echoes from fixed objects provide fixed amplitude pulses and echoes from moving objects provide varying amplitude pulses, means for distinguishing between said fixed and moving object echoes comprising a storage device including a cathode ray tube having beam deflection means, an electron emissive storage mosaic on which the beam impinges and an output load impedance coupled to the storage mosaic, a time base voltage generator, means to impress said generator output on said beam deflection means to deflect said beam along a time base, means to impress said pulses on said beam deflection means to deflect said beam in a direction other than along said time base, whereby said varying amplitude pulses develop pulse voltages across said output impedance and said fixed amplitude pulses develop a substantially steady voltage across said output impedance and a utilization circuit responsive only to said pulse voltages connected to said output impedance.

5. A system for distinguishing between periodically occurring pulses of constant amplitude and interspersed periodically occurring pulses of varying amplitude, comprising a storage device including a cathode ray tube having an electron emissive storage mosaic, beam deflection means and an output impedance coupled to said storage mosaic, sweep voltage generating means coupled to said beam deflection means to periodically deflect said beam over a predetermined pattern on said mosaic, and means to impress said pulses on said beam deflection means to deflect said beam in a direction other than along said predetermined pattern whereby said varying amplitude pulses deflect the beam onto various portions of the storage mosaic and thereby develop a pulse voltage across said output impedance and said constant amplitude pulses repeatedly deflect the beam over the same portion of the storage mosaic and thereby develop a substantially constant voltage across said output impedance.

ALFRED G. EMSLIE.

REFERENCES CITED

The following references are of record in the file of this patent:

UNITED STATES PATENTS

| Number | Name | Date |
|---|---|---|
| 2,284,714 | Bedford | June 2, 1942 |
| 2,422,135 | Sanders | June 10, 1947 |
| 2,430,038 | Wertz | Nov. 4, 1947 |